No. 782,003.

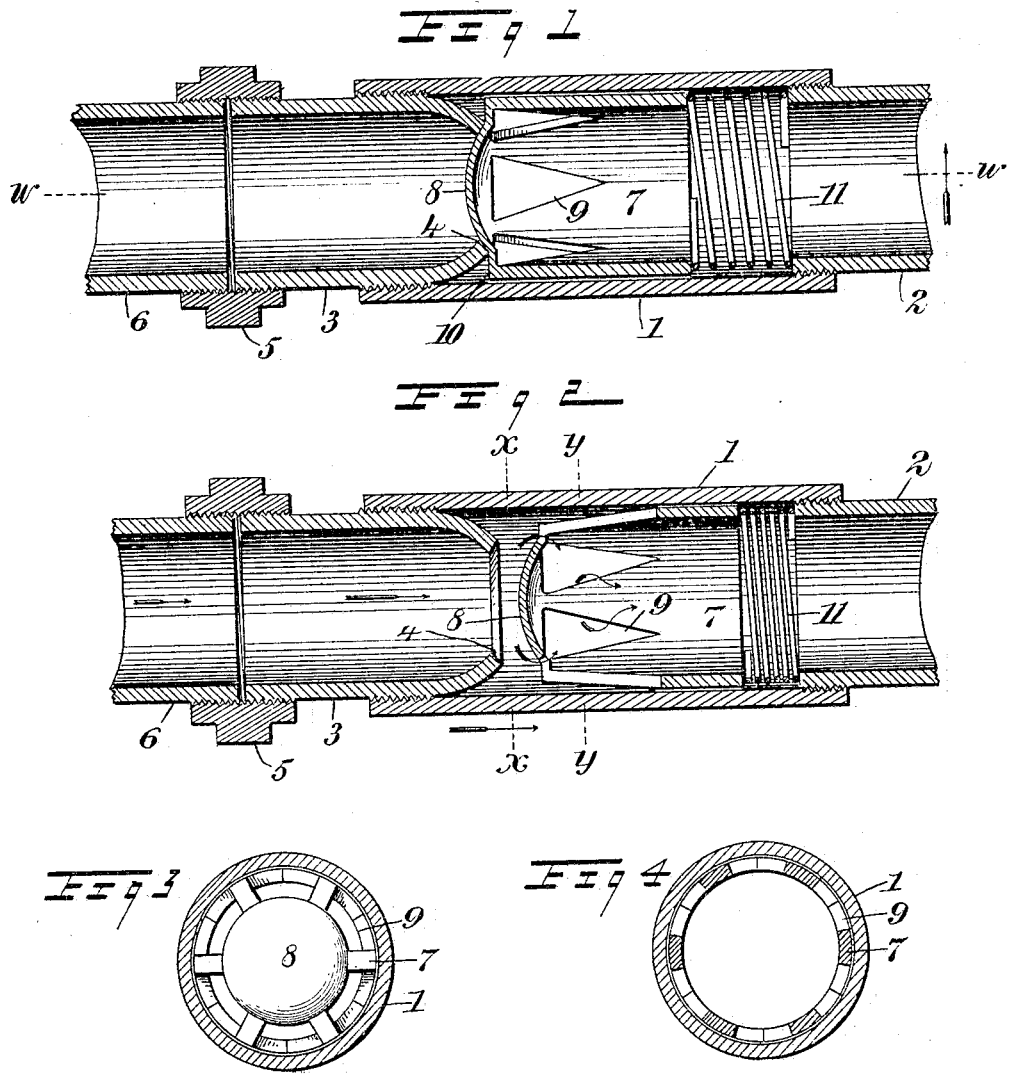

Patented February 7, 1905.

UNITED STATES PATENT OFFICE.

CHARLES PATRICK CARLIN, OF CHICAGO, ILLINOIS.

VALVE.

SPECIFICATION forming part of Letters Patent No. 782,003, dated February 7, 1905.

Application filed June 7, 1904. Serial No. 211,471.

*To all whom it may concern:*

Be it known that I, CHARLES PATRICK CARLIN, a citizen of the United States, and a resident of Chicago, in the county of Cook and State of Illinois, have invented a new and Improved Valve, of which the following is a full, clear, and exact description.

This invention relates to improvements in pressure-actuated valves, the object being to provide a valve of this character having very few and simple parts not liable to get out of order and that may be made at a comparatively small cost.

I will describe a valve emboding my invention and then point out the novel features in the appended claims.

Reference is to be had to the accompanying drawings, forming a part of this specification, in which similar characters of reference indicate corresponding parts in all the figures.

Figure 1 is a longitudinal section showing a valve mechanism embodying my invention. Fig. 2 is a section on the line $w\ w$ of Fig. 1, showing the valve open. Fig. 3 is a section on the line $x\ x$ of Fig. 2. Fig. 4 is a section on the line $y\ y$ of Fig. 2.

Referring to the drawings, 1 designates a casing or sleeve, to one end of which a pipe 2 connects, and connected to the other end is a nipple 3, having its inner open end contracted and forming a valve-seat 4. At the outer end the nipple is connected, by means of a coupling-collar 5, with a pipe-section 6. The valve 7, operating in the casing 1, is substantially cup-shaped and has its closed end convexed, as indicated at 8, to engage with the valve-seat 4, the opposite end being open. In its side wall the valve is provided with ports 9, which are of triangular form, and the ends adjacent to the valve-seat open through an annular shoulder 10, which is somewhat larger than the contracted end of the nipple.

In case the valve is used in a horizontal pipe the valve is held yieldingly against its seat by means of a spring 11, which engages with the inner end of the pipe 2 and with the end of the cup-shaped valve 7. It may be here stated that in case the valve is used with an upright pipe the spring may be omitted and the valve closed by gravity.

Having thus described my invention, I claim as new and desire to secure by Letters Patent—

1. A valve mechanism comprising a casing, a nipple extended therein and having a contracted open end, a cup-shaped valve movable in the casing and having a convexed end portion for engaging in said opening of the nipple, an annular shoulder formed around said convexed portion, and ports formed through said shoulder and through the side wall of the valve.

2. A valve mechanism comprising a casing, a nipple extended therein and having a contracted upper end, a cup-shaped valve movable in the casing and having a convexed end portion for engaging in said end of the nipple, an annular shoulder formed around said convexed portion, ports formed through said shoulder and through the side wall of the valve, and a spring for moving the valve to closing position.

In testimony whereof I have signed my name to this specification in the presence of two subscribing witnesses.

CHARLES PATRICK CARLIN.

Witnesses:
JOHN F. CARLIN,
JOHN E. DALTON.